United States Patent
Yao et al.

(10) Patent No.: US 11,335,081 B2
(45) Date of Patent: May 17, 2022

(54) METHOD FOR AUTOMATIC EXTRACTION OF DATA FROM GRAPH

(71) Applicant: HANGZHOU DIANZI UNIVERSITY, Hangzhou (CN)

(72) Inventors: Jinliang Yao, Hangzhou (CN); Yuelun Yu, Hangzhou (CN); Chuang Hu, Hangzhou (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 16/997,242

(22) Filed: Aug. 19, 2020

(65) Prior Publication Data

US 2021/0110194 A1 Apr. 15, 2021

(30) Foreign Application Priority Data

Oct. 14, 2019 (CN) .......................... 201910972334.8

(51) Int. Cl.
*G06V 30/00* (2022.01)
*G06V 10/426* (2022.01)
*G06V 10/22* (2022.01)
*G06V 10/28* (2022.01)
*G06V 10/30* (2022.01)
*G06V 10/56* (2022.01)
*G06V 10/44* (2022.01)
(Continued)

(52) U.S. Cl.
CPC ............ *G06V 10/426* (2022.01); *G06V 10/22* (2022.01); *G06V 10/28* (2022.01); *G06V 10/30* (2022.01); *G06V 10/457* (2022.01); *G06V 10/56* (2022.01); *G06V 30/413* (2022.01); *G06V 30/414* (2022.01); *G06V 30/10* (2022.01)

(58) Field of Classification Search
CPC ... G06K 9/00442–00483; G06K 9/469; G06K 9/2054; G06K 9/38; G06K 9/40; G06K 9/4638; G06K 9/4652; G06K 2209/01; G06V 10/426; G06V 10/56; G06V 10/457; G06V 10/30; G06V 10/28; G06V 10/22; G06V 30/00–43
See application file for complete search history.

(56) References Cited

U.S. PATENT DOCUMENTS 6,473,522 B1 * 10/2002 Lienhart ................ G06K 9/325
382/164
2009/0088999 A1 * 4/2009 Bryll .................... G01B 21/045
702/86

(Continued)

*Primary Examiner* — Sean T Motsinger

(57) ABSTRACT

A method for automatic extraction of data from a graph, including text area locating and text box classification; locating of coordinate axes, and locating of the positions of hatch marks on the coordinate axes; legend locating and information extraction; extracting corresponding bar or polyline connected components according to legend color, and filtering and classification; determining key points on the X-axis and locating a corresponding X-axis label for each key point; locating key points of the bars and polyline according to the X-axis key points, determining labeled numerical text boxes that correspond to the key points, and identifying the numerical text; calculating a corresponding value for each pixel, and estimating corresponding values of the key points of the bars or polyline; determining a final result according to a difference between the estimated values and the recognized labeled values.

9 Claims, 8 Drawing Sheets

(51) Int. Cl.
*G06V 30/413* (2022.01)
*G06V 30/414* (2022.01)
*G06V 30/10* (2022.01)

(56) References Cited

U.S. PATENT DOCUMENTS

| | | | |
|---|---|---|---|
| 2016/0044196 A1* | 2/2016 | Baba | G06K 9/00463 358/488 |
| 2017/0351708 A1* | 12/2017 | Lahmann | G06K 9/4604 |
| 2018/0336405 A1* | 11/2018 | Messina | G06K 9/4628 |
| 2019/0163970 A1* | 5/2019 | Yu | G06K 9/00463 |
| 2019/0266395 A1* | 8/2019 | Yu | G06K 9/00463 |
| 2019/0266434 A1* | 8/2019 | Yu | G06T 11/206 |
| 2019/0266435 A1* | 8/2019 | Yu | G06K 9/00456 |
| 2020/0210746 A1* | 7/2020 | Mesmakhosroshahi | G06K 9/00449 |
| 2020/0234003 A1* | 7/2020 | Bakman | H04W 4/50 |
| 2020/0311406 A1* | 10/2020 | Tazzini | G06F 40/169 |
| 2020/0401799 A1* | 12/2020 | Sahoo | G06K 9/00469 |
| 2021/0110194 A1* | 4/2021 | Yao | G06K 9/00442 |

\* cited by examiner

METHOD FOR AUTOMATIC EXTRACTION OF DATA FROM GRAPH

CROSS-REFERENCE TO RELATED APPLICATIONS

This application claims priority to Chinese Patent Application No. 201910972334.8, filed Oct. 14, 2019.

TECHNICAL FIELD

The present disclosure relates to the fields of computer image processing and pattern recognition, and in particular to a method for automatic extraction of data from a graph.

BACKGROUND

Bar charts, line charts and the like are a more intuitive way of presenting data, and are widely used in various industries, especially in finance, scientific research, statistics, etc. However, in daily work, when one wants to cite, in their report or article, data contained within a bar chart or line chart made by others, it becomes difficult to obtain the data contained within the graph because the original data is not available. A simple way is to obtain data intuitively by observation, estimation, measurement, etc. But this intuitive estimation is imprecise and inefficient. It would be of great benefit if there was an automated data extraction method that could improve the efficiency and precision of data acquisition.

Currently, there is a semi-automatic method for obtaining data from bar charts and line charts. This method mainly includes manually labeling minimum and maximum positions on the coordinate axes and corresponding values, height positions of the bars and key points on the polyline to obtain the values at specific positions on the X-axis. Representative software adopting this method includes GetData and Engauge Digitizer.

Bar charts and line charts are a representation of data according to a certain rule, in the form of images. In essence, an image is a collection of pixels, each pixel having a RGB value and arranged at a different position. Image analysis mainly includes using an image processing method to identify information such as the bounding rectangle of the bar, color, and the position of the polyline, in order to further extract data.

In the present disclosure, bar charts, line charts and mixed graphs of bar charts and line charts are collectively referred to as "data graphs," i.e., graphs generated from data. A data graph may involve various standard elements, including: X-axis, Y-axis, hatch mark values, hatch mark lines, hatch marks, X-axis labels, X-axis label intervals, coordinate axes, legends, etc. In order to facilitate understanding of the various elements of a data graph, FIG. 1 shows an exemplary labeled graph. In addition, the bar chart has a bar foreground and the line chart has a line foreground, and key points on the bars or lines are provided with labeled values. These key elements may be omitted from the data graphs in some cases, and the layout may change. Generally speaking, there may be two Y-axes, on the left and right respectively; the bars may be in a horizontal direction; the legends may be in different places; Y-axis hatch mark values may be missing. These elements of the data graphs are interdependent, i.e., there are positional relationships between one another. Generally speaking, hatch mark values of a left Y-axis must exist to the left of the Y-axis; hatch mark values of a right Y-axis must exist to the right of the Y-axis; hatch mark values of an X-axis must exist below the X-axis; the legend generally consists of solid blocks, lines or dots, different parts of the same legend are of the same color, and there are text characters to the right of the legend.

Technologies and methods relating to image processing and pattern recognition are needed to locate and identify these key elements. However, automatic extraction of data from a graph is a technical problem that needs to be solved urgently.

SUMMARY OF PARTICULAR EMBODIMENTS

An object of the present disclosure is to provide a method for automatic extraction of data from a graph, in view of the low efficiency problem in the prior art using semi-automatic data extraction.

In some embodiments, the method of the present disclosure uses a deep learning method to locate text boxes in a data graph and perform character recognition, then extracts all kinds of other elements according to a certain order and rules, verifies whether the locating and identification of the elements are correct using a positional correlation between the elements, and finally calculates the height of key points on the bars and the line chart, obtains the estimated value of the key points of the bars or the polylines by an obtained corresponding value of each pixel on the coordinate axis, and compares it with an identified value, to determine an optimal result.

The present disclosure provides at least the following technical solutions:

A method for automatic extraction of data from a graph, for extracting element data from a data graph with bars or polylines, comprising the steps of:

S1: text area locating and text box classification in data graph according to steps S11 to S15:

S11: obtaining a data graph where data is to be extracted, locating all text boxes within the data graph by deep learning, and performing character recognition;

S12: counting the number of text boxes at each position in X direction of the data graph, to obtain an array of numbers of text boxes at different positions in X direction; obtaining a local maximum of the numbers of text boxes in the array and a corresponding position; obtaining the difference between an average number of text boxes in a middle area in X direction and a local maximum of the array, and determining there is a Y-axis hatch mark value text box at the corresponding position of the local maximum if the difference is within an threshold; and determining all text boxes at the corresponding position of the local maximum as the Y-axis hatch mark value text boxes according to the position, to obtain a Y-axis hatch mark value text box list;

S13: performing a text box spacing consistency test on the Y-axis hatch mark value text box list using a noise data filtering method, with the spacing between adjacent text boxes being a filtering condition;

S14: obtaining an X-axis hatch mark value text box list according to a method similar to S12 and S13;

S15: identifying graph title text in a graph title text box according to size characteristics of the graph title text box and positional distribution characteristics in the data graph;

S2: locating of coordinate axes, and locating of the positions of hatch marks on the coordinate axes according to steps S21 to S22:

S21: locating coordinate axes from the data graph, which comprises:

first calculating a horizontal gradient and a vertical gradient of the data graph, respectively, and determining vertical edge pixels and horizontal edge pixels according to a horizontal gradient result and a vertical gradient result, respectively;

then counting the number of consecutive edge pixels in each column and the number of consecutive edge pixels in each row, determining an edge pixel column whose number of consecutive edge pixels exceeds a set threshold as a candidate Y-axis, and determining an edge pixel row whose number of consecutive edge pixels exceeds a set threshold as a candidate X-axis;

then merging adjacent candidate coordinate axes whose distance is less than a distance threshold;

finally determining the coordinate axis and axis hatch mark value text box lists according to a positional relationship between candidate coordinate axes and candidate axis hatch mark value text box lists;

S22: locating the positions of hatch marks on X-axis and Y-axis sequentially, where each of the coordinate axes is located by:

first extracting a coordinate axis area image centered at a coordinate axis, where the width of the area image in a direction vertical to the coordinate axis covers the entire coordinate axis and hatch marks on the coordinate axis;
then binarizing the coordinate axis area image, where the coordinate axis and the hatch marks on the coordinate axis are foreground;
then counting foreground pixels in the binarized image in a direction vertical to the coordinate axis in a row-by-row or column-by-column manner;
then obtaining a local maximum of an array obtained from the counting, as the position of a candidate hatch mark;
finally filtering the obtained candidate hatch mark by a noise data filtering method, to obtain an actual hatch mark on the coordinate axis;

S3: legend locating and information extraction according to steps S31 to S36:

S31: performing connected component analysis by calculating color distances between adjacent pixels, to find all connected components with similar colors in the data graph; obtaining an average color value for each connected component, as the color of the connected component; and counting the number of pixels in the connected component and bounding rectangles;

S32: filtering all the connected components according to height, width, number of pixels, aspect ratio and compactness of the connected components using a threshold method, to obtain a candidate legend meeting a legend requirement;

S33: scanning all possible candidate legend connected components in pairs, so that two connected components meeting color and height consistency requirements are combined into a new candidate legend;

S34: performing S31 to S33 on each of the three areas of the data graph: above, to the right of, and below a data area, to obtain all candidate legends in these three areas; selecting candidate legends in an area with the largest number of candidate legends as actual legends of the data graph according to the number of candidate legends in each of the three areas;

S35: performing layout analysis on the obtained actual legends according to spatial positions of the legends, to determine whether the legends in the data graph are arranged in a vertical, horizontal or hybrid layout; and filtering out legends nonconforming with the layout;

S36: according to the layout of the legends, searching for a corresponding legend text box for each legend from the data graph, and identifying text characters and character color from each legend text box;

S4: extracting corresponding bar or polyline connected components according to legend color, and filtering and classification according to steps S41 to S45:

S41: combining background color, character color in the text and legend color into a color list of a variety of color classes; scanning the pixels in the data area of the data graph, calculating color distances between the color of a pixel and the variety of colors in the color list, and determining a color class having the smallest color distance as the class of the pixel;

S42: performing connected component analysis on pixels of each class, filtering the connected components by a threshold method, to obtain a corresponding set of connected components for each legend in the data area;

S43: based on the height, width, number of pixels and compactness of the connected components, scanning all connected component sets according to a threshold, to determine for each connected component whether the connected component is a bar, and if it is a bar, calculating the variance of the heights of all bars and the variance of the widths of all the bars in the graph, determining whether the bars in the bar chart are horizontal or vertical according to the variances, and calculating the width of the bars; if there is no bar, determining that the data graph is a line chart, with a vertical layout;

S44: according to the layout direction type of the data graph, identifying for each legend whether a connected component set corresponding to the legend is a bar or a polyline, and determining a classification axis and a numerical axis in the data graph;

S45: for all the connected components corresponding to legends identified as bars, selecting a bar whose width meets the bar width described in S43 as a candidate bar for the legend, and analyzing the spatial positions and distances of all the bars to identify whether there is a bar divided by a polyline into two connected components, and if there is, recombining them into one;

S5: determining key points on the classification axis and locating a corresponding classification-axis label for each classification-axis key point according to the layout direction type of the data graph;

S6: locating key data points of the bars or polyline according to the classification-axis key points, determining a corresponding labeled numerical text box for each key data point, and identifying the numerical text;

S7: calculating a corresponding value for each pixel according to the numerical axis, and estimating corresponding values for the key points of the bars or polyline;

S8: for each key data point in the data graph, performing error verification on the identified numerical value by the estimated value, to determine a final result.

Preferably, the noise data filtering method comprises:
comparing all the data to be filtered in pairs, to find a data pair with the smallest value difference corresponding to the filter condition; if the value difference meets an error requirement, calculating the average of the data pair and determining the average of the data pair as a standard value; then calculating a difference between each of the rest of the data to be filtered and the standard value, and filtering out data with a difference exceeding a threshold.

Preferably, in step S12, if there are Y-axis hatch mark value text boxes on both sides of the data graph, it is determined that there are two Y-axes, left and right; and a left Y-axis hatch mark value text box list and a right Y-axis hatch mark value text box list are obtained.

Preferably, in step S33, the new legend has a bounding rectangle composed of the bounding rectangles of the two connected components, the number of pixels is the sum of the pixels of the two connected components, and the color is the average of the colors of the two connected components.

Preferably, in step S41, if there is no legend in the data graph, pixels in the data area with a non-background and non-character color are of a foreground class.

Preferably, step S44, the determining a classification axis and a numerical axis in the data graph comprises:

when the data graph is in a vertical layout, determining the X-axis as the classification axis and the Y-axis as the numerical axis; when the data graph is in a horizontal layout, determining the Y-axis as the classification axis and the X-axis as the numerical axis.

Preferably, step S5 comprises:

S51: if there are hatch marks on the classification axis, sorting them based on their positions according to the obtained hatch marks on the classification axis; and determining a middle point of two adjacent hatch marks as a classification axis key point;

S52: if there is no hatch mark on the classification axis, determining a middle point between classification axis hatch mark value text boxes as a classification axis key point; and filtering the obtained classification axis key points by a noise data filtering method.

Preferably, step S6 comprises:

S61: determining key data points of the bars or polyline respectively, where the key data point of a vertical bar is a middle point of the top edge of the bar, and the key data point of a horizontal bar is a middle point of the far right of the bar, and the key data points of a polyline are the data points on the polyline vertically corresponding to the key points of the classification axis;

S62: according to the position of each key data point, the layout of the data graph and the positions of the text boxes in the graph, searching for a corresponding labeled numerical text box for each key data point;

S63: identifying a labeled numerical value in each labeled numerical text box.

Preferably, step S7 comprises:

S71: matching according to the positional relationships between the hatch marks on the numerical axis and the labeled numerical text boxes on the numerical axis, and identifying the values in the labeled numerical text boxes on the numerical axis;

S72: for any two adjacent hatch marks on the numerical axis, calculating a corresponding value for each pixel according to the difference between the number of pixels between two hatch marks and the difference between the values in the corresponding labeled numerical text boxes, where the calculated values form a single pixel corresponding value list;

S73: filtering out noise from the single pixel corresponding value list by a noise data filtering method;

S74: calculating an average value of the single pixel corresponding value list after the noise filtering, as a final corresponding value M of the single pixel;

S75: according to the obtained corresponding value M of the single pixel and the bar height H of the key data points, calculating an estimated value for each key data point, where the bar height H of a data graph in a vertical layout is the distance from the key data point to the X-axis, and the bar height H of a data graph in a horizontal layout is the distance from the key data point to the left Y axis.

Preferably, step S8 comprises:

for each key data point in the data graph, comparing the labeled value obtained by step 63 with the estimated value obtained by step 75, and if within an error range, determining the recognition result correct and determining the labeled value as the value of the key point; otherwise, determining the estimated value as the value of the key point.

Compared with the prior art, the present disclosure has the following beneficial effects:

The present disclosure can automatically extract data contained within data graphs (bar charts and line graphs). The method of the present disclosure is applicable to most bar charts, line charts and mixed data graphs of the two, and has a high recognition accuracy and speed. In addition, the method can directly store the data within the chart in an Excel format, which includes most of the information, including the legend, X-axis labels and data series.

DETAILED DESCRIPTION OF PARTICULAR EMBODIMENTS

Figure 1:
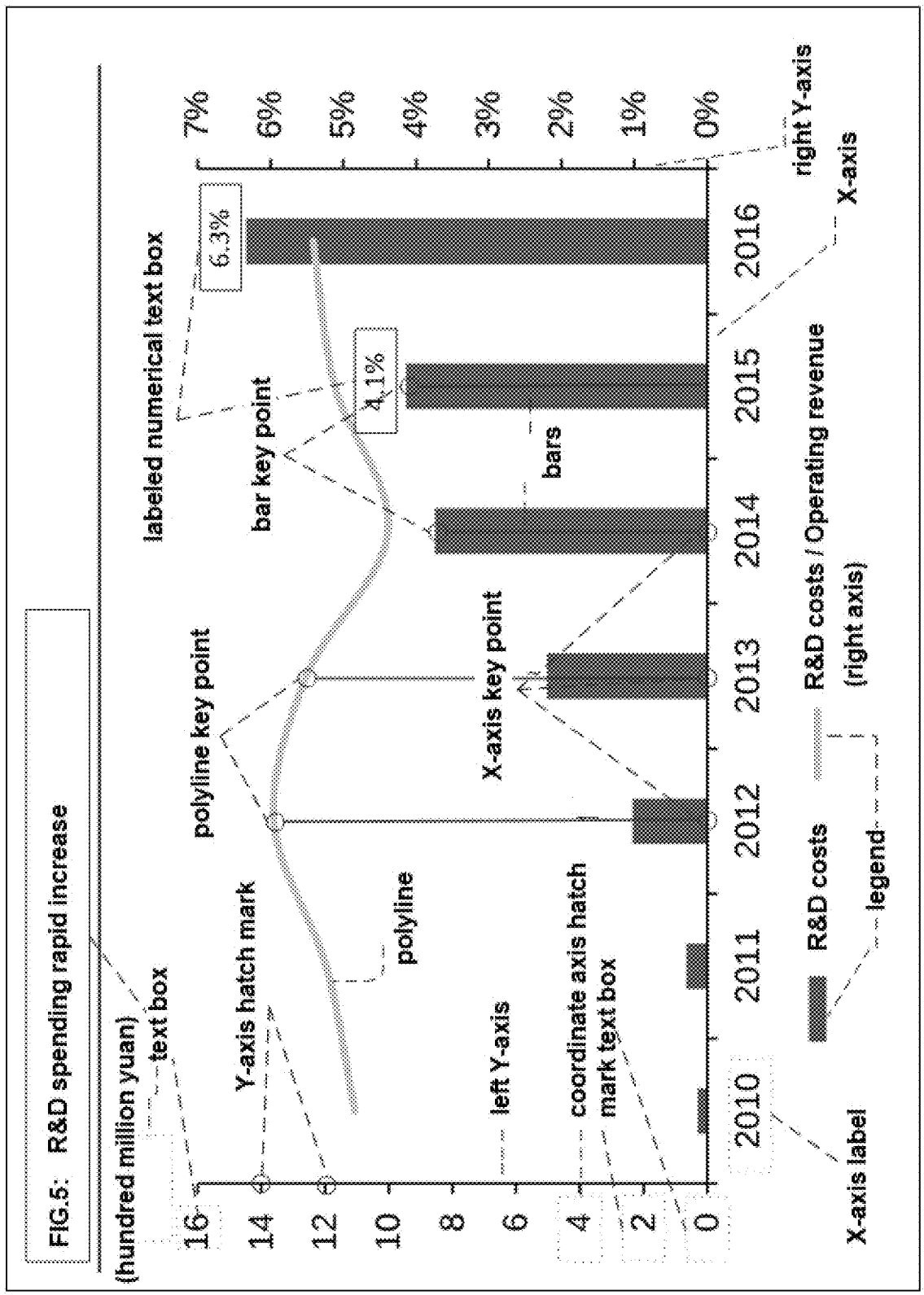
FIG. 1 illustrates exemplary elements of a data graph.

The present disclosure will be further described below with reference to the drawings and specific embodiments. The technical features of the various embodiments of the present disclosure can be combined according to actual needs if there is no conflict.

In view of the problem of extracting data contained within a data graph (bar graph or line graph), the present disclosure provides a method for automatic extraction of data from a graph based on image processing and recognition. This method can effectively extract data from most conventional data graphs.

The specific technical solutions used in the present disclosure are described as follows.

A method for automatic extraction of data from a graph includes the following steps:

(1) text area locating and text box classification in a data graph;

(2) locating of coordinate axes, and locating of the positions of hatch marks on the coordinate axes;

(3) legend locating and information extraction;

(4) extracting corresponding bar or polyline connected components according to legend color, and filtering and classification;

(5) determining key points on the X-axis and locating a corresponding X-axis label for each key point;

(6) locating key points of the bars and polyline according to the X-axis key points, determining labeled numerical text boxes that correspond to the key points, and identifying the numerical text;

(7) calculating a corresponding value for each pixel, and estimating corresponding values of the key points of the bars or polyline;

(8) determining a final result according to a difference between the estimated values and the recognized labeled values, and storing.

The above 8 steps may form a continuous process of obtaining various element information from a data graph, and the steps may be dependent on one another. For example, text box locating is a prerequisite for text box classification, and also a basis for subsequent data identification. The steps are described in detail below.

1. Text Area Locating and Text Box Classification in Data Graph

Text area locating and text box classification refer to determining a rectangular box where text is using an existing text locating method, and classifying the text box according to a positional relationship of the text box and relationships between the text box and other objects. In the present disclosure, the text box may be any of the 6 types: Y-axis hatch mark value text box (left or right), X-axis label text box, graph title, labeled numerical text box, and other text boxes. In the present disclosure, text box layout characteristics mainly include: there are more Y-axis text boxes in a certain position area than in the middle position area in the X direction of the image; there are more X-axis label text boxes in a certain position area than in other position areas in the Y direction of the image; vertical and horizontal projections of the text boxes can be used to locate: position areas of the Y-axis text boxes in the X direction of the image, and position areas of the X-axis label text boxes in the Y direction of the image. Y-axis text boxes and X-axis label text boxes are determined using the located positions of X-axis and Y-axis. The specific process of classification is as follows:

Before proceeding to the next step, for the data graph where data is to be extracted, all text boxes within the data graph are located by deep learning, and character recognition is performed.

1-1: Upon obtaining of all the text boxes, coordinate axis hatch mark value text boxes are identified. Because Y-axis hatch mark value text boxes are distributed on the left or right side of the data graph, the positions of the text boxes are all in a certain interval in the X direction of the image, and the text boxes are evenly arranged along the vertical direction, the present disclosure adopts a vertical projection method, i.e., regardless of the vertical positions of the text boxes, counting the number of text boxes at each X position of the image (in other words, the number of text boxes on each vertical line passing through the positions) and forming an array of numbers of text boxes, in which the number of text boxes at each position in the X direction is stored. Then, a local maximum and a corresponding position are obtained from the array. The array may have multiple local maximums, but most of the corresponding positions may not match the positions of the coordinate axis hatch mark value text boxes and will be deleted. Because coordinate axes are generally located on either side of the data graph, and will not appear in the middle position, the middle position of the data graph can be used as a judgment criterion. In the present disclosure, then, the difference between the average number of text boxes in the middle area in the X direction and the local maximum of the array are obtained, and compared with a predetermined threshold, if a difference is larger than the predetermined threshold, it is judged that there is a Y-axis hatch mark value text box; otherwise there is no Y-axis hatch mark value text box. The size of the middle area in the X direction in the array can be adjusted according to actual needs. Generally, the middle area can be obtained by expanding the exact middle of the graph by a certain percentage to each side. Finally, according to the corresponding position of the local maximum, all text boxes at the position are preliminarily determined as the Y-axis hatch mark value text boxes, and a list of Y-axis hatch mark value text boxes is obtained.

In addition, if there are maximums and corresponding positions meeting the criterion on both sides, a list of left Y-axis hatch mark value text boxes and a list of right Y-axis hatch mark value text box are obtained.

1-2: In order to remove mistakes where text boxes such as graph titles and copyright declarations are identified as Y-axis hatch mark value text boxes, the consistency of spacing between text boxes is used to identify and judge, to remove text boxes that do not meet the consistency requirements. The text box spacing consistency test is realized by an independent method (noise data filtering, explained in the next step). In this step, text box spacing is a filtering condition.

1-3: The noise data filtering method is based on a recognized fact that most of the numbers in the array have a small difference, while some have a large difference. Specifically, this includes: comparing all the data to be filtered in pairs, to find a data pair with the smallest value difference corresponding to the filter condition; if the value difference meets an error requirement calculating the average of the data pair and determining the average of the data pair as a standard value, if the value difference does not meet the error requirement, determining that there is no number meeting the consistency requirements; then, calculating a difference between each of the rest of the data to be filtered and the standard value, determining a ratio of the difference to the standard value as a basis for measurement, and filtering according to a threshold, where the filtering removes data that exceeds the threshold.

Specifically, the filtering condition can be determined according to actual needs. For example, in the step 1-2, text box spacing is used as the filter condition, then the spacing between adjacent text boxes is to be calculated. Other filtering conditions are similar.

1-4: Similar to steps 1-1 to 1-3, horizontal projection is used to obtain a list of X-axis label text boxes.

Specifically, this is done by swapping X and Y, that is:

counting the number of text boxes at each Y position of the image, to obtain an array storing the number of text boxes at each position in the Y direction. The number of text boxes at each position in the Y direction can also be obtained by counting the number of text boxes on a vertical line passing through the position. Then, a local maximum and a corresponding position are obtained from the array; the difference between the average number of text boxes in the middle area in the Y direction and the local maximum of the array are obtained, and compared with a threshold, if a difference is within the threshold, it is judged that there is an X-axis hatch mark value text box at the corresponding position of the local maximum. Finally, according to the corresponding position of the local maximum, all text boxes at the position are preliminarily determined as the X-axis hatch mark value text boxes, and a list of X-axis hatch mark value text boxes is obtained. Nonconforming text boxes are removed by noise filtering in step 1-3.

1-5: Graph title text in a graph title text box is identified according to size characteristics of the graph title text box and positional distribution characteristics in the data graph. In the present disclosure, the graph title can be identified according to width or height of the text box, or whether the text box is above or below the data graph.

2. Locating of Coordinate Axes, and Locating of the Positions of Hatch Marks on the Coordinate Axes Locating of coordinate axes, and locating of the positions of hatch marks on the coordinate axes refer to determining the positions of the Y-axis and X-axis and determining the corresponding hatch mark value text box lists, and locating the positions of the hatch marks on the coordinate axes. The specific process is as follows.

2-1: Locating of coordinate axes is performed on the data graph, which includes the following steps:

2-1-1: calculating a horizontal gradient and a vertical gradient of the image, respectively;

2-1-2: determining edge pixels according to the horizontal gradient or vertical gradient result and a threshold;

2-1-3: counting the number of consecutive edge pixels in each column (horizontal gradient result) and the number of consecutive edge pixels in each row (vertical gradient result); and determining an edge pixel column whose number of consecutive edge pixels exceeds a set threshold as a candidate Y-axis, and determining an edge pixel row whose number of consecutive edge pixels exceeds a set threshold as a candidate X-axis;

2-1-4: setting a minimum distance threshold between coordinate axes, and merging adjacent candidate coordinate axes whose distance is less than the distance threshold, to solve the problem that one line may produce two edge lines;

2-1-5: determining the coordinate axis and the axis hatch mark value text box lists according to the positional relationship between the candidate coordinate axes and candidate axis hatch mark value text box lists. Here, the positional relationship mainly includes: left Y-axis text boxes are to the left of the left Y-axis and have the same height; right Y-axis text boxes are to the right of the right Y-axis and have the same height; X-axis label text boxes are below the X-axis and have the same width.

2-2: Locating the positions of hatch marks on X-axis and Y-axis:

First, an axis area image is extracted, where the axis is at the center and the width of the area image in a direction vertical to the axis covers the entire axis and hatch marks on the axis. Then, the axis area image is binarized, where the coordinate axis and the hatch marks on the coordinate axis are the foreground. Then, the number of foreground pixels of the binarized image in a direction vertical to the axis are counted in a row-by-row or column-by-column manner; whether it is row-by-row or column-by-column depends on which axis is to be located. Then, a local maximum of the array from the counting are obtained and determined as the position of a candidate hatch mark. Finally, the obtained candidate hatch mark positions are filtered by the noise data filtering method of step 1-3, to obtain actual hatch marks on each coordinate axis.

Specific steps include:

2-2-1: locating the positions of Y-axis hatch marks: first, extracting an image of a certain width with the X coordinate of the Y-axis as the center; then binarizing; then horizontally counting the binarized image; then, obtaining a local maximum and determining it the position of a candidate hatch mark.

2-2-2: locating the positions of X-axis hatch marks: first, extracting an image of a certain width with the Y coordinate of the X-axis as the center; then binarizing; then vertically counting the binarized image; then, obtaining a local maximum and determining it as the position of a candidate hatch mark.

2-2-3: filtering the obtained candidate hatch marks by the noise data filtering method of step 1-3.

3. Legend Locating and Information Extraction

Legend locating and information extraction include obtaining, filtering, combining, and verifying legend connected components, and calculating and identifying color of the legend, and the legend text box corresponding to the legend after the legend locating. Specifically, these include the following steps:

3-1: performing connected component analysis by calculating color distances between adjacent pixels, to find all connected components with similar colors in the data graph; obtaining an average color value (e.g., RGB color average) for each connected component, as the color of the connected component; and counting the number of pixels in the connected component and bounding rectangles.

3-2: filtering all the connected components according to the height, width, number of pixels, aspect ratio and compactness (compactness=number of connected component pixels/area of connected component bounding frame) and a threshold, to obtain candidate legends meeting a legend requirement. Generally, in the filtering, any connected component that does not meet the filtering condition should be deleted.

3-3: scanning all possible candidate legend connected components in pairs, so that two connected components meeting color and height consistency requirements (i.e., the color difference between the two legends is less than a threshold, and the height difference is also less than a threshold) are combined into a new candidate legend;

3-4: determining a data area of the data graph according to the X-axis and Y-axis determined previously. When the data area has been determined, the remaining area in the data graph can be divided into four parts, in relation to the data area: above, below, left and right. Steps S31 to S33 are performed on the three areas above, right and below in relation to the data area respectively, to obtain all candidate legends in these three areas. According to the number of candidate legends in each of the three areas, the candidate legends in the area with the largest number of candidate legends are selected as the actual legends of the data graph.

3-5: performing layout analysis on the obtained actual legends according to the spatial positions of the legends, to determine whether the legends in the data graph are arranged in a vertical, horizontal, or hybrid layout; and filtering out legends nonconforming with the layout;

3-6: according to the layout of the legends, searching for a corresponding legend text box for each legend from the data graph, and identifying text characters and character color in each legend text box.

4. Extracting Corresponding Bar or Polyline Connected Components According to Legend Color, and Filtering and Classification Extracting corresponding bar or polyline connected components according to legend color and filtering and classification refer to obtaining connected components with the same color as the legends from the data graph according to the color of the legends, and filtering out some noise connected components (smaller ones) according to a threshold; then identifying whether the connected components corresponding to the legends are bars or a polyline according to the aspect ratio and compactness; finally, obtaining the position, length and width of the bars and positional information of the foreground pixels. In the present disclosure, foreground pixels (pixels of the bars and the polyline) are extracted according to the color of the legends and by a nearest neighbor method.

Specifically, the process includes the following steps:

4-1: combining background color, character color in the text and legend color into a color list according to the background of the graph, characters in the text and legends obtained by the previous steps; scanning the pixels in the data area, and determining the one closest to the color in the color list as the class of the pixel. Here, if there is no legend in the data graph, pixels in the data area that are neither background color nor character color are extracted as a foreground class.

4-2: performing connected component analysis on pixels of each class, filtering the connected components according to a threshold, to filter out connected components with pixels smaller than the threshold, and obtaining a corresponding set of connected components for each legend in the data area.

4-3: based on the height, width, number of pixels and compactness of the connected components, scanning all the connected component sets according to a threshold, to determine for each set whether the connected component is a bar, and if it is a bar, calculating the variance of the heights of all bars and the variance of the widths of all the bars in the graph, and determining whether the bars in the bar chart are horizontal or vertical according to the variances. The widths of the bars in the same chart are usually the same, but the lengths vary; therefore, the variances reflect the direction in which the bars are. Then, the width of the bars is calculated (if the bars are horizontal, the average height of the connected components is calculated). If there is no bar, it is determined that the data graph is a line chart, and a line chart is a data graph with a vertical layout.

4-4: according to the layout direction type (vertical layout or horizontal layout) of the data graph, identifying for each legend whether a connected component set corresponding to the legend is a bar or a polyline, and determining a classification axis and a numerical axis in the data graph. The classification axis and numerical axis in the data graph are determined by: when the data graph is in a vertical layout, determining the X-axis as the classification axis and the Y-axis as the numerical axis; when the data graph is in a horizontal layout, determining the Y-axis as the classification axis and the X-axis as the numerical axis.

4-5: for all the connected components corresponding to the legends identified as bars, selecting a bar whose width meets the bar width described in S43 as a candidate bar for the legend, and analyzing the spatial positions and distances of all the bars to identify whether there is a bar divided by a polyline into two connected components, and if there is, recombining them into one;

4-6: for all the connected components corresponding to the legends identified as a line, obtaining a sequence of points on the line corresponding to the X axis, i.e., data points on the polyline vertically corresponding to the positions of the X axis, and if there are multiple data points corresponding to the same position, selecting a representative point (e.g., an average point) to remove extra points corresponding to the X-axis.

5. Determining Key Points on the X-Axis and Locating a Corresponding X-Axis Label for Each Key Point The specific process includes the following steps:

5-1: if there are hatch marks on the classification axis, sorting them based on their positions according to the obtained hatch marks on the classification axis; and determining the middle point of two adjacent hatch marks as a classification axis key point;

5-2: if there is no hatch mark on the classification axis, determining the middle point between classification axis hatch mark value text boxes as a classification axis key point; and filtering the obtained classification axis key points by the noise data filtering method of steps 1-3.

5-3: in other extreme cases, if there are no hatch marks and no classification axis label text box, the number of legends is less than 3, and there are bars in the data graph, determining the middle position on the bottom of the classification axis as the key point position.

6. Locating key points of the bars and polyline according to the X-axis key points, determining labeled numerical text boxes that correspond to the key points, and identifying the numerical text. The specific process includes the following steps:

6-1: determining key data points of the bars or polyline respectively, where the key data point of a vertical bar is the middle point of the top edge of the bar, and the key data point of a horizontal bar is the middle point of the far right of the bar, and the key data points of a polyline are the data points on the polyline vertically corresponding to the key points of the classification axis;

6-2: according to the position of each key data point, the layout of the data graph and the positions of the text boxes in the graph, searching for a corresponding labeled numerical text box for each key data point by means of distance and setting a threshold;

6-3: identifying a labeled numerical value in each labeled numerical text box by a digital recognition engine.

7. Calculating a Corresponding Value for Each Pixel, and Estimating Corresponding Values of the Key Points of the Bars or Polyline Calculating a corresponding value for each pixel, and estimating corresponding values of the key points of the bars or polyline refer to estimating a corresponding value for each pixel according to the obtained Y-axis hatch mark value text boxes, the positions of the Y-axis hatch marks, the height of the bars and the corresponding text box values. When the corresponding value of each pixel has been obtained, estimated values of the key point are calculated according to the obtained coordinate axes and the positions of the key points. In the present disclosure, the estimation of the corresponding value of each pixel is mainly by locating the positions of the coordinate axis hatch marks. Specifically, this includes the following steps:

7-1: matching according to the positional relationships between the hatch marks on the numerical axis and the labeled numerical text boxes on the numerical axis, and identifying the values in the labeled numerical text boxes on the numerical axis;

7-2: for any two adjacent hatch marks on the numerical axis, calculating a corresponding value for each pixel according to the difference between the number of pixels between two hatch marks and the difference between the values in the corresponding labeled numerical text boxes, where the calculated values form a single pixel corresponding value list;

7-3: filtering out noise from the single pixel corresponding value list by the noise data filtering method;

7-4: calculating the average value of the single pixel corresponding value list after the noise filtering, as a final corresponding value M of the single pixel;

7-5: according to the obtained corresponding value M of the single pixel and the bar height H of the key data points, calculating an estimated value for each key data point, where the bar height H of a data graph in a vertical layout is the distance from the key data point to the X-axis, and the bar height H of a data graph in a horizontal layout is the distance from the key data point to the left Y axis.

This step also includes: determining whether the numerical axis is the X-axis or Y-axis according to the layout of the graph.

8. Determining a Final Result According to a Difference Between the Estimated Values and the Recognized Labeled Values, and Storing For each key data point in the data graph, comparing the labeled value obtained by step 6-3 with the estimated value obtained by step 7-5, and if within an error range, determining the recognition result correct, and determining the labeled value as the value of the key point; otherwise, determining the estimated value as the value of the key point.

Specifically, in this step, error estimation is performed on the estimated value (est_val) obtained at the key point of the bar or polyline and the recognized result (reco_val) of the labeled value obtained from key point scanning, i.e., error=2*abs (est_val-reco_val)/(est_val+reco_val), and if error is less than a given threshold, determining the recognition result correct and determining the recognition result of the labeled value as the value of the key point; otherwise, determining the estimated value as the value of the key point.

Various elements and values finally identified in the above step can be stored to an Excel table, for easy viewing. The steps 1 to 8 will be described further with reference to embodiments, so that those skilled in the art can better understand the implementation of the present disclosure. In the following embodiment, since each step has been described in detail, parts of the implementation and principles are omitted.

EMBODIMENTS

Figure 2:
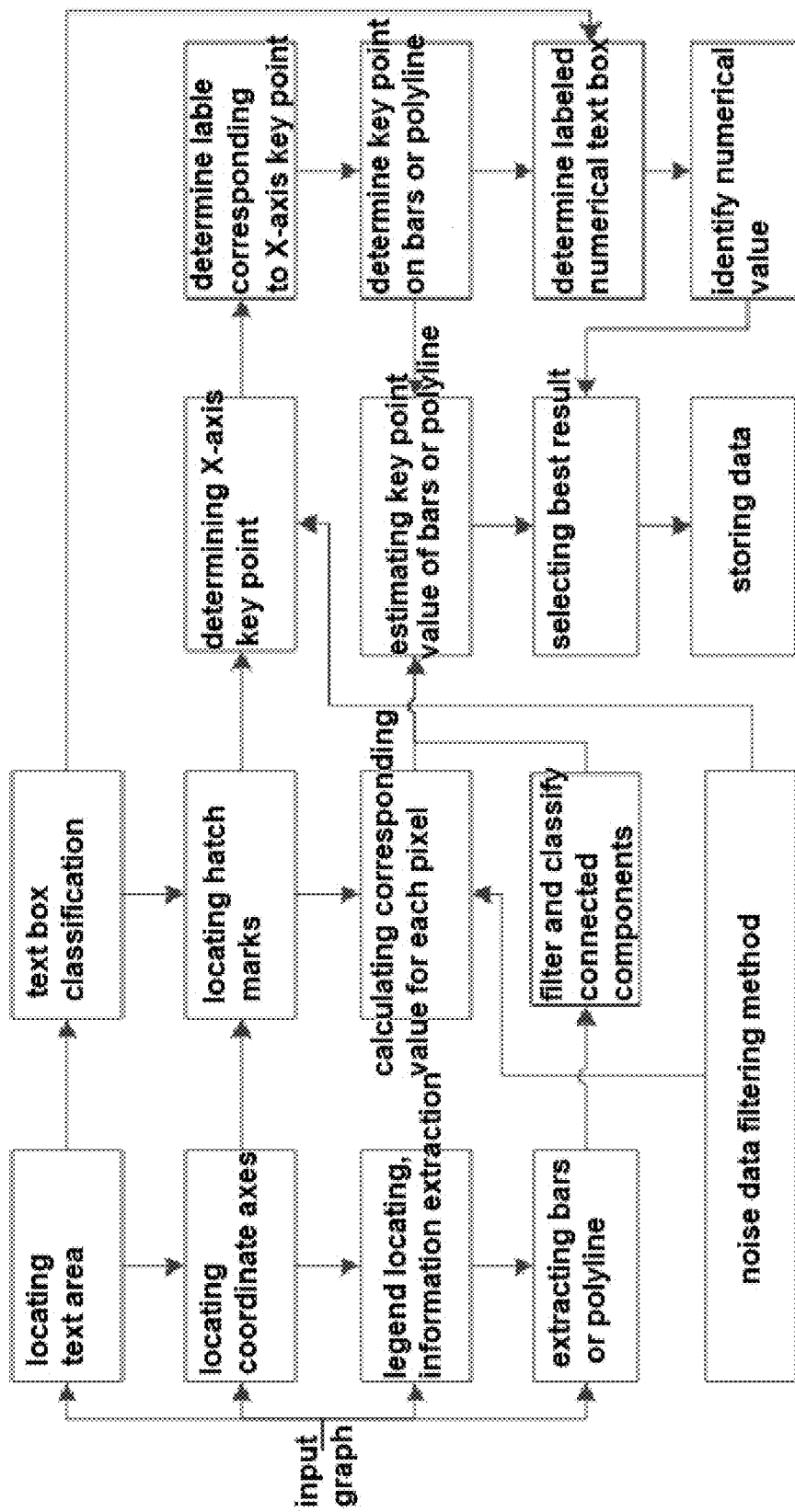
FIG. 2 is a flow chart of a method according to the present disclosure.
Figure 3:
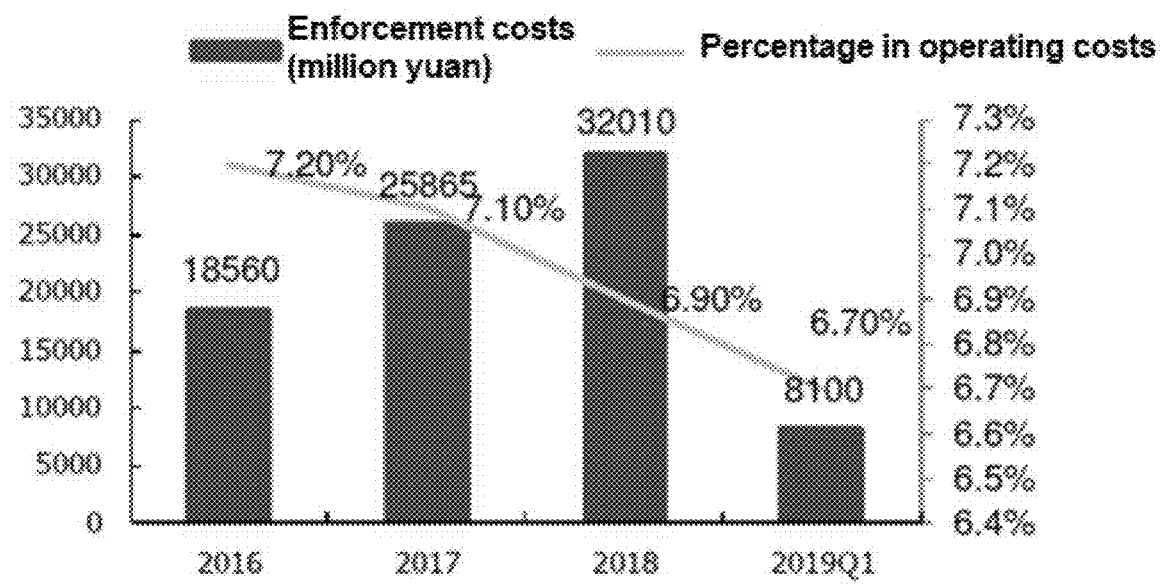
FIG. 3 shows an inputted original data graph.

Embodiments of the present disclosure will be further described below in conjunction with a method flowchart. FIG. 1 illustrates exemplary elements of a data graph, for a better understanding of the terminology of the present disclosure. FIG. 2 is a flow chart of a method according to the present disclosure, showing the relationships between the steps of the present disclosure and its flow. FIG. 3 shows an inputted original data graph, sized 932*527. The figure includes bars and a polyline, in a vertical layout. There are two legends, two coordinates axes Y-axis and X-axis on the left and right respectively.

For this data graph, the method for automatic extraction of data includes the following steps.

1. Text Area Locating and Text Box Classification in a Data Graph

Figure 4:
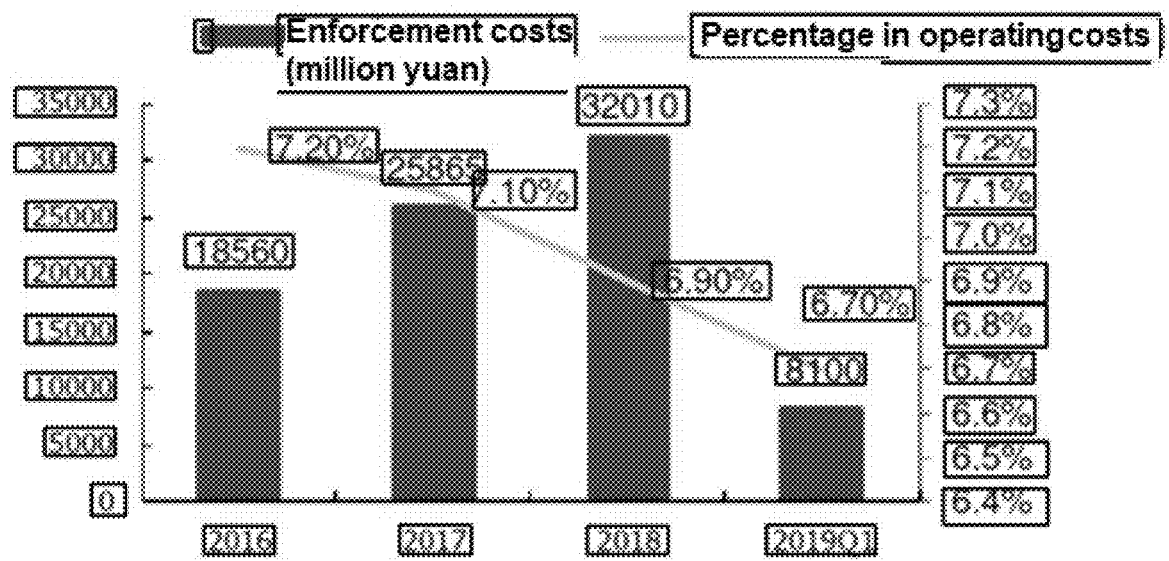
FIG. 4 shows a result from text locating.

There are many text detection methods in the field of deep learning, such as: *EAST: An Efficient and Accurate Scene Text Detector*. In this embodiment, a text detection method based on a CNN+LSTM model (*Detecting Text in Natural Image with Connectionist Text Proposal Network*) is used for the text region locating. For the processed data graph, this embodiment collects some samples and re-learns; the obtained result of detection by the trained model is shown in FIG. 4. The accuracy of text locating is high; however, because there are many line and text-like foreground targets, some errors do occur, including the problem of the large gaps between the located text box and the height of the characters.

Figure 5:
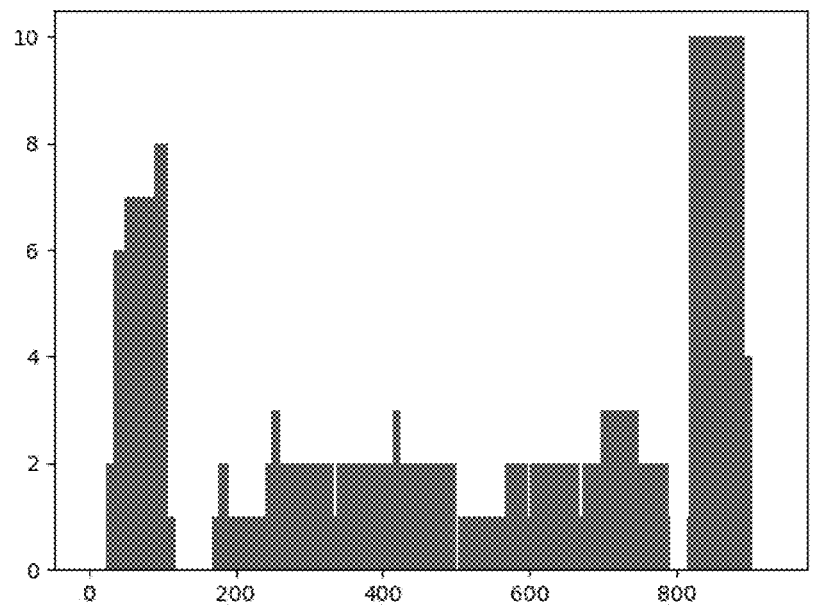
FIG. 5 shows a result from vertical projection of text boxes.

Upon locating the positions of the text boxes, the text boxes are classified, to facilitate further information extraction. The text boxes are classified mainly according to a positional relationship of the text box and relationships between the text box and other objects. In the embodiment, the text box may be any of the 6 types: Y-axis hatch mark value text box (left or right), X-axis label text box, graph title, labeled numerical text box, and other text boxes. Y-axis hatch mark value text boxes are arranged vertically, distributed in the same horizontal position area, and the number is large. X-axis label text boxes are basically distributed in the same height area, i.e., arranged horizontally, and the number is large. The other text boxes are highly randomly distributed according to the height of the bar or the polyline, exhibit no consistency. Therefore, classification can be performed by the positional relationships and distribution patterns of the text boxes. The specific process of classification is as follows:

Because Y-axis hatch mark value text boxes are distributed on the left or right side of the data graph, the positions of the text boxes are all in a certain interval in the X direction of the image, and the text boxes are evenly arranged along the vertical direction, this embodiment adopts a vertical projection method, i.e., regardless of the vertical positions of the text boxes, counting the number of text boxes at each X position of the image and forming an array of numbers of text boxes. Then, a local maximum and a corresponding position are obtained from the array. FIG. 5 shows a result from vertical projection of the text boxes according to the embodiment. In FIG. 5, the Y-axis is the number of text boxes, and the X-axis is the X position in the graph [0, image width]. It can be seen that maximum values correspond to these horizontal positions: [89, 108], [177, 192], [248, 261], [415, 425], [568, 598], [601, 668], [697, 749], [818, 893].

Next, all text boxes including the position of the local maximum are determined as Y-axis hatch mark value text boxes, according to the position of the local maximum. That is, those text boxes having a left border smaller than the position of the maximum and a right border larger than the position of the maximum are determined as the Y-axis numerical text boxes. Then, the differences between the number of maximum text boxes in the vertical projection of the middle area and the local maximum are obtained and compared with a given threshold, if a difference is larger than the threshold, it is determined that there is a Y-axis hatch mark value text box. In this figure, the number of maximums in the middle area is 3, the number of maximums in the left area is 8 (i.e., 8 text boxes are arranged vertically) and the number of maximums in the right area is 10. By comparing the numbers of maximums in the left and right areas and the middle area, it is determined that there are left Y-axis and right Y-axis numerical text boxes.

In order to remove mistakes where text boxes such as graph titles and copyright declarations are identified as Y-axis hatch mark value text boxes, in this embodiment, the consistency of spacing between text boxes is used to identify and judge, to remove text boxes that do not meet the consistency requirements. The spacing between text boxes is the difference between the heights of the centers of adjacent text boxes. 10 text boxes will result in 9 spacings. The text box spacing consistency test is realized by an independent method (noise data filtering). The method is based on a recognized fact that most of the numbers in the array have a small difference, while some have a large difference. Specifically, this includes: comparing the data in pairs, to find a data pair with the smallest difference, and determining whether the distance meets a requirement, and if so, calculating the average of the data pair and determining the average of the data pair as a standard value; if not, determining that there is no number meeting the consistency requirements; then, calculating a difference between each of the rest of the data and the standard value, determining a ratio of the difference to the standard value as a basis for measurement, and filtering according to a threshold. The threshold used in this embodiment is 0.1.

Figure 6:
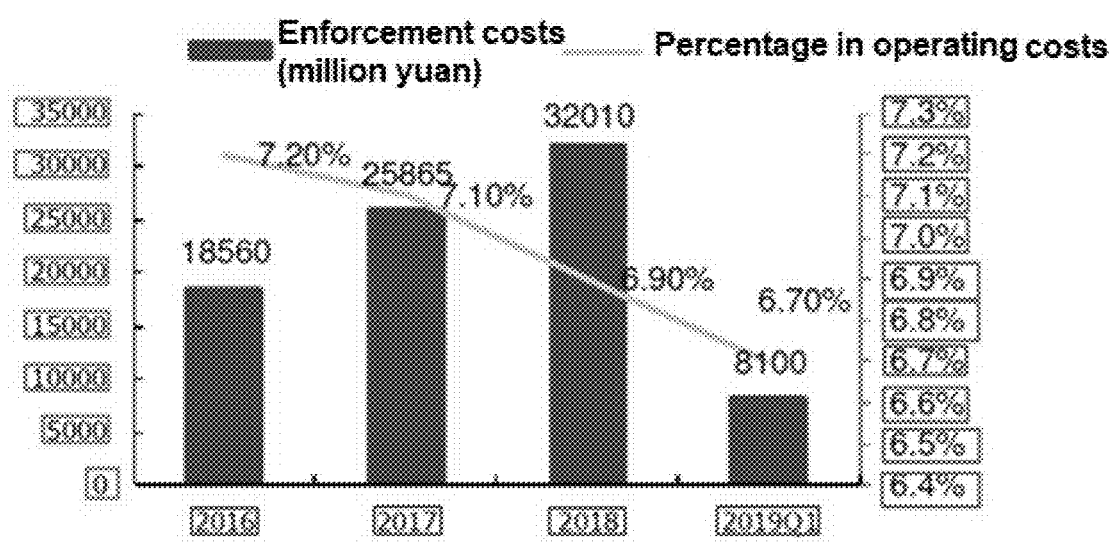
FIG. 6 shows a result from classification of the text boxes.

The classification method for the Y-axis numerical text boxes above can be used again, with little modification to a horizontal projection method, i.e., the numbers of text boxes are projected to the Y direction of the image, to obtain local maximums, and further obtain an X-axis label text box list. The result from the text box classification is shown in FIG. 6. The boxes on the left are identified as left Y-axis hatch mark value text boxes, the boxes on the right are identified as right Y-axis hatch mark value text box, and boxes at the bottom are identified as X-axis label text boxes.

Graph title can be identified according to width or height of the text box, or whether the text box is above or below the data graph. Because graph title generally contains a larger number of characters, the width of its text box is also larger than other text boxes; moreover, graph title generally has a font size larger than the that of other text boxes, correspondingly the height of the text box of graph tile is larger than other text boxes. In addition, graph title is in an upper or lower position of the graph. Therefore, similar to the classification of Y-axis numerical text boxes, in the present disclosure, the whole graph is divided into three parts: upper, middle, and lower, and a maximum height and a maximum width of text boxes in each part are obtained. If there is a text box in the upper or lower part of the graph having a height larger than the sum of the maximum height of text boxes in the middle part plus a threshold, and the text box in the upper or lower part of the graph has a width larger than the sum of the maximum width of text boxes in the middle part plus a threshold, it is determined that the text box is a graph title box.

2. Locating of Coordinate Axes, and Locating of the Positions of Hatch Marks on the Coordinate Axes (1) Locating Coordinate Axes, and Determining Corresponding Hatch Mark Value Text Box Lists Locating of coordinate axes refers to determining the positions of the Y-axis and X-axis, i.e., determining the positions of the two endpoints (x1, y1) and (x2, y2) of the line segments in the graph coordinate system. Because the coordinate axes are either vertical (Y-axis) or horizontal (X-axis), x1 and x2 of the two ends of the Y-axis are equal, and y1 and y2 of the two ends of the X-axis are equal. Many existing edge detection methods can be used to detect the coordinate axes, e.g., canny. Because the Y-axis in the data graph is vertical, its edges are mainly composed of gradients in the horizontal direction; the X axis is horizontal, so its edges are mainly composed of gradients in the vertical direction. Therefore, this embodiment calculates horizontal and vertical gradients of the image respectively, determines edge pixels according to the horizontal or vertical gradient result and a threshold, count the number of consecutive edge pixels in each column (horizontal gradient result) or each row (vertical gradient result), and determines candidate coordinate axes according to a threshold. In this embodiment, the threshold for the number of consecutive edge pixels for the Y-axis is defined as image height*0.5, and consecutive edge pixels with a count larger than the threshold is a candidate coordinate axis; the threshold for the number of consecutive edge pixels for the X-axis is defined as image width*0.5. In the grayscale image, pixels with a horizontal or vertical gradient larger than 15 are considered edge pixels.

Figure 7:
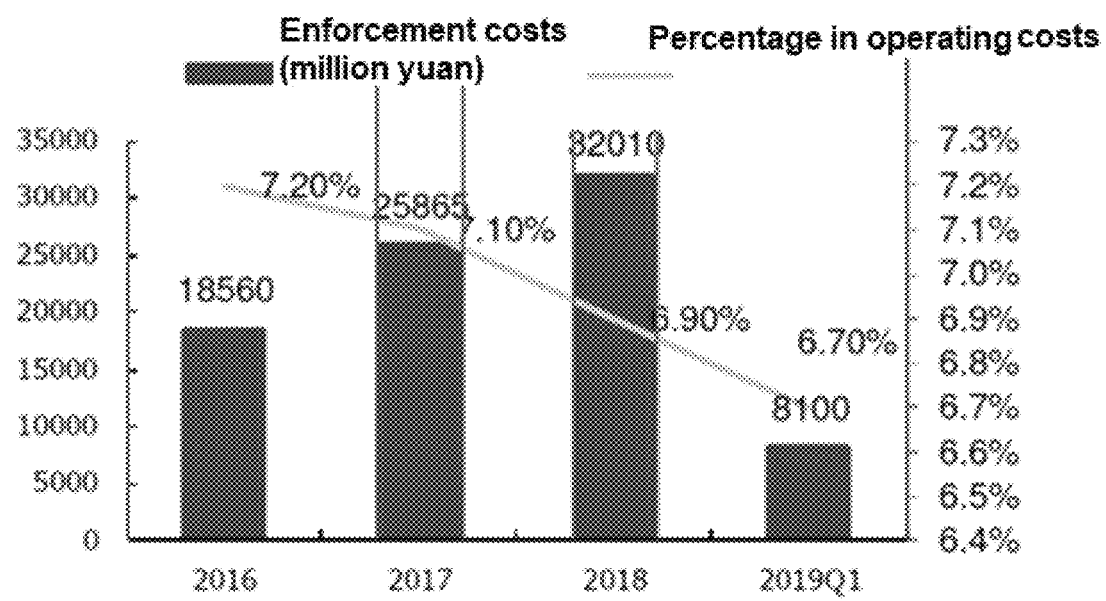
FIG. 7 shows a candidate Y-axis.

Since one coordinate axis may produce two edge lines, in the embodiment a distance threshold is used to merge two adjacent candidate coordinate axes into one: for the Y-axis, determining whether the difference between the x1 coordinates of the two candidate coordinate axes is less than a given threshold; for the X-axis, determining whether the difference between the y1 coordinates of the two candidate X axes is smaller than a given threshold. In this embodiment, the threshold is set to 5. When a coordinate axis is merged, the intermediate value is taken as a new x1 (for Y-axis) or a new y1 (for X-axis). In this embodiment, the result of merging candidate Y-axes is shown in FIG. 7, where the vertical lines are the located candidate Y-axes.

As can be seen from the obtained candidate Y-axis, the edge of a bar is also considered a Y-axis. Therefore, the positions of the candidate coordinate axes and their relationships with candidate coordinate axis hatch mark value text box lists are used to determine the coordinate axes and the coordinate axis hatch mark value text box lists. The positional relationships mainly include: left axis text boxes are to the left of the left Y-axis and have the same height; right axis text boxes are to the right of the right Y-axis and have the same height; X-axis label text boxes are below the X-axis and have the same width. Noise coordinate axes can be well removed by the constraint positional relationship with the coordinate axis hatch mark text boxes.

(2) Locating the Positions of Hatch Marks on the Coordinate Axes

Coordinate axis hatch marks refer to small black dots on the axes. The locating of the positions of them is mainly used to calculate the corresponding value of each pixel. In this embodiment, the positions of Y-axis hatch marks are taken as an example. The locating of X-axis hatch marks is similar to that of the Y-axis.

Figure 8:
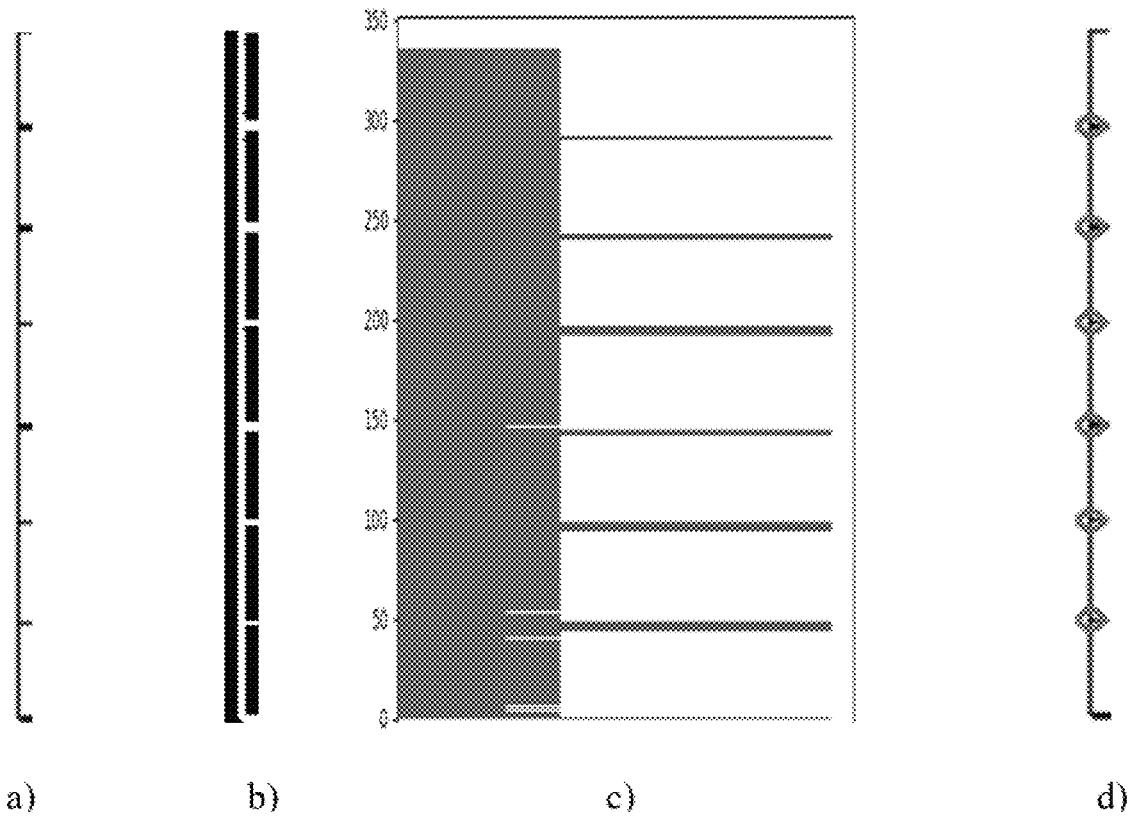
FIG. 8 shows the process of locating Y-axis hatch marks, specifically, a) is the extracted coordinate axis, b is the result from binarization, c) is the result from horizontal projection of foreground pixels, and d) is the result from the locating (circles)

First, extracting an image with a width of 15 pixels, a height of [y1, y2], and centered at x1 of the Y-axis ((x1, y1), (x2, y2)); then, binarizing the image. Because hatch marks are protruding dots, there are more foreground pixels. Therefore, the number of foreground pixels of the binarized image are counted horizontally. Then local maximums are obtained and determined as the positions of the candidate hatch marks. Finally, the obtained candidate hatch mark positions are filtered by a noise data filtering method. Intermediate results of the calculation are shown in FIG. 8, where the drawings from left to right are: extracted coordinate axis, result from binarization, result from horizontal projection of foreground pixels, and result from the locating.

The locating of X-axis hatch marks is similar to that of the Y-axis, which includes: extracting an image of a certain height centered at the Y coordinate (y1) of the X-axis; binarizing the image; counting the binarized image vertically; then, obtaining local maximums as the positions of the candidate hatch marks. Finally, a noise data filtering method is used to filter the obtained candidate mark marks.

3. Legend Locating and Information Extraction

Legend locating and information extraction mainly include obtaining, filtering, combining, and verifying legend connected components, and calculating and identifying color of the legend, and the legend text box corresponding to the legend after the legend locating. Specifically, these include the following steps:

(1) Performing connected component analysis by calculating color distances between adjacent pixels. This process includes calculating the color distances between adjacent pixels using 4-connectivity. In the embodiment, the distance formula for two colors (r1, g1, b1) and (r2, g2, b2) is: distance=abs (r1−r2)+abs (b1−b2)+abs (g1−g2). It is considered connected when the distance is less than a given threshold. Through continuous iterations, connected components with similar colors are found. Once a connected component is labeled, an average RGB value of the connected component is obtained as the color of the connected component, and the number of pixels of the connected component and the bounding rectangle are counted.

(2) Filtering the obtained connected components according to height, width, number of pixels, aspect ratio and compactness. The filtering is mainly based on a threshold, to delete connected components that are least unlikely to be connected components of the legend. In the embodiment the thresholds are defined as: number of pixels >16, and width >1, and height <width*1.5, and width <image width*0.2, and number of pixels/(width*height) >0.85. Connected components that meet all these conditions are determined as candidate legends.

(3) Because one legend may be represented by multiple connected components, the multiple connected components are combined into one legend. It is assumed here that the color and height of the connected components of the same legend are the same. This step includes: scanning all possible candidate legend connected component pairs, and if the color distance is less than a given threshold and the center height of two connected components is less than a given threshold, determining that the two connected components can be combined. The combined connected components are a new legend. The bounding rectangle of the new legend is composed of the bounding rectangles of the two connected components; the number of pixels is the sum of the pixels of the two connected components; and the color is the average of the colors of the two connected components.

Figure 9:
FIG. 9 shows a result from legend locating (black rectangular frame)

(4) In order to eliminate the effect of the bars and the polyline in the graph, and because most legends are in the three areas of the graph: upper, middle and lower, the legend extraction of the embodiment may include: extracting legends from only the upper, middle and lower areas of the graph respectively; and determining the legends of the whole graph according to the number of legends obtained in respective areas, where the legends in the part with the largest number of legends are selected as the correctly located legends. FIG. 9 is the legend result obtained from the upper area, marked in black. The bounding rectangle (left, top, right, bottom), color (in BGR) and number of pixels of the left legend are [183, 61, 258, 78], [150, 64, 2] and 2589 respectively. The bounding rectangle, color and number of pixels of the right legend are [525, 70, 595, 73], [192, 192, 192] and 492 respectively.

(5) There are generally more than one legend, and the distribution of multiple legends follows a pattern, which mainly includes: vertical layout, horizontal layout and hybrid layout. Determination of the layout of the legends can be used to filter out legends nonconforming with the layout, and to find the text boxes corresponding to the legends. The determining the legend layout mainly includes: comparing in pairs, to put legends with a height difference less than a given threshold into the same array, and scanning all the legends to obtain a list of legend arrays of different heights. If there is only one array in the list, it is determined that the legend layout is horizontal; if there are multiple arrays and each array contains multiple legends, it is determined that the legend layout is hybrid; if the array in the list has only one legend, it is determined that legend layout is vertical. In this embodiment, the legend layout is identified as horizontal. When the legend layout has been determined, if it is hybrid or vertical, it is determined whether the height between two legends in different rows meets a given threshold, so as to remove some cases where special character connected components (e.g., the Chinese character for number one: 一) are identified as legends.

Figure 10:
FIG. 10 shows a located legend text box (color of the box represents the legend it belongs to)

(6) According to the layout of the legends, searching for corresponding legend text boxes. The text box corresponding to a legend is generally on the right side of the legend and at the same height. A simple method is to find the text box to the right according to the position of the legend. Because a legend is often a colored line, it can easily be identified as part of the text box by text locating, in which case it is desirable that the legend and the text box corresponding to the legend be re-divided. The embodiment includes: judging whether to re-divide the text box by judging whether the bounding frame of the legend intersects the text box, and if so, dividing the text box into two parts according to left and right borders of the bounding frame of the legend. If a section is too narrow, it is not a valid text box. When the text box corresponding to the legend has been detected, the characters in the text box are recognized by a character recognition engine. In the embodiment, the obtained legend text box is shown in FIG. 10 (color of the box represents color of the corresponding legend). The recognition results are: "Enforcement costs (million yuan)" and "Percentage in operating casts". In this example, "costs" is recognized as "casts" mainly due to inaccurate text locating.

4. Extracting Corresponding Bar or Polyline Connected Components According to the Legends, and Filtering and Classification Connected components with the same color as the legends are obtained from the data graph according to the color of the legends, and some noise connected components (smaller ones) are filtered out according to a threshold. Then, it is identified whether the connected components corresponding to the legends are bars or a polyline according to the aspect ratio and compactness. Finally, the position, length and width of the bars and positional information of the foreground pixels are obtained. Specifically, the following steps are included:

(1) Extracting Foreground Pixels

Foreground pixels are the pixels representing the bars or polyline in the image. In order to extract the connected components of the bars or polyline, first foreground pixels in the image are extracted according to the color. Foreground pixels can be extracted using a threshold method. Because there may be multiple foregrounds of different colors, and there may be foregrounds of different classes with similar colors, the embodiment uses a nearest neighbor method that combines background color, character color in the text and legend color into a color list; scans the pixels in the data area, and determines the one closest to the color in the color list as the class of the pixel, and if there is no legend, uses a non-background and non-character color in the data area as a foreground class. Based on legend extraction, the foreground pixel results obtained by the nearest neighbor method in this embodiment are shown in the following figure, where black pixels are non-foreground pixels. It can be seen that many pixels at the edges of characters are recognized as foreground, mainly because the foreground pixels are gray (192, 192, 192), and the edges of characters are blurred due to image compression and the like and color becomes closer to (192, 192, 192).

(2) Performing connected component analysis on pixels of each class, to obtain a corresponding set of connected components for each legend. The class here corresponds to the legend. Because connected components composed of edge pixels that are recognized as foreground generally have a small number of pixels, the embodiment method filters according to whether the number of pixels of a connected component meets a threshold requirement. The threshold is set to 30.

(3) Because bars generally have a large width, more pixels, large height and great compactness (number of pixels/area of bounding frame), a threshold method is used to determine whether a connected component is a bar according to the number of pixels, height, width and compactness of the connected component for each of the connected components in the connected component set. If there are bars, the variance of the heights and the variance of the widths are calculated, and it is determined whether the bars are horizontal or vertical according to the variances. Then, the width of the bars is calculated, where if the bars are horizontal, the width of the bars is the average height of the bar connected components; if the bars are vertical, the width of the bars is the average width of the bar connected components. If there is no bar, it is determined that the data graph is a line chart, and a line chart is a data graph with a vertical layout, thus determining whether the data graph is in a horizontal layout or vertical layout.

(4) According to the layout type (horizontal or vertical) of the data graph, identifying for each legend whether the connected component list corresponding to the legend is a bar or a polyline. Because some data graphs are a mix of the two forms, bars and polyline, it is desirable to determine whether the connected component list corresponding to a legend is a bar or a polyline. If there are bars, the average width of the bars has been obtained in step (4). This embodiment assumes that the widths of all bars are the same. Therefore, the number of bars in the connected component list corresponding to a legend that meet a threshold requirement can be determined according to the width of the bars and a threshold. When the number of bars is larger than 2, it is determined that the whole connected component list is composed of bars; otherwise, it is a connected component of a line.

Figure 11:
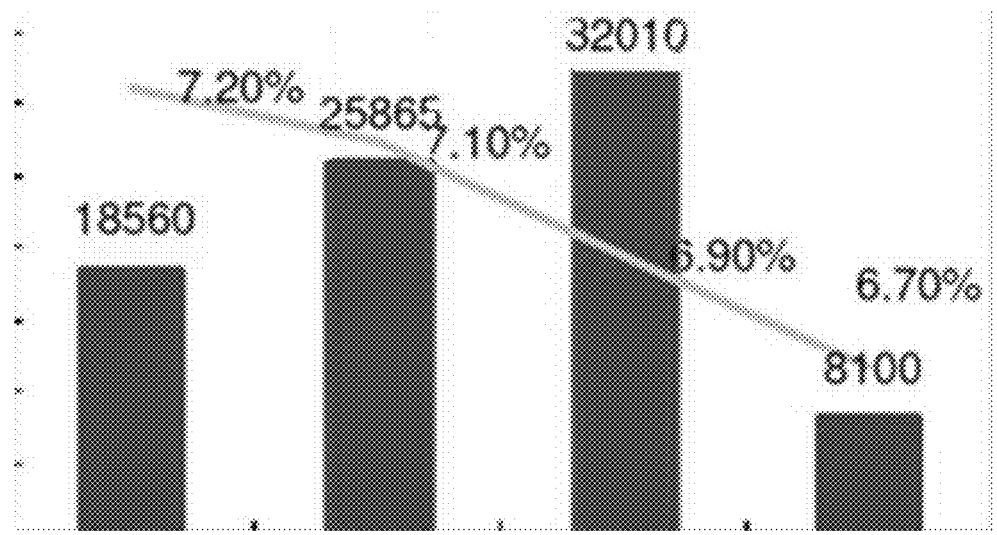
FIG. 11 shows a result from extracting foreground pixels according to the legend color (foreground color is the corresponding legend color)

(5) For all the connected components corresponding to the legends identified as bars, selecting candidate bars according to the width of the bars, and combining according to the positions and distances, to eliminate the effect of a division by a polyline. As shown in FIG. 11, the third bar has been divided into two connected components by the polyline; in this step, they are combined into a new bar. The number of pixels of the new bar connected component is the sum of the two previous ones; the top value of the bounding rectangle is the top value of the upper one; and the bottom value of the bounding rectangle is the bottom value of the lower one.

(6) For all the connected components corresponding to the legends identified as a line, obtaining a sequence of points on the line corresponding to the X axis, and removing extra points corresponding to the X-axis. Because there is noise and the lines are relatively thick, in the coordinate system there may be multiple lines of foreground pixels corresponding to one x position. This step is to remove the extra points, by simply scanning every x coordinate in the coordinate system, and calculating an average y coordinate if there are multiple points. A point sequence such as (x, mean (y)) represents a polyline.

5. Determining Key Points on the X-Axis and Locating a Corresponding X-Axis Label for Each Key Point When the point sequence of the polyline has been determined, it is determined which of the points are key points (intersecting points in the line chart). One approach is to detect straight lines by Hough transform and calculate the intersections. However, some line charts use curvy lines, which cannot be detected using a straight line detection method. In the embodiment, the key points of a polyline are located by locating the key points of the X-axis. The locating of X-axis key points includes the following steps:

(1) In most graphs, the key points of the X-axis are in the middle position between the positions of the X-axis hatch mark; therefore, the embodiment sorts the obtained hatch mark position sequence on the X axis, and determines a middle point of adjacent hatch mark positions as a key point of the X axis;

(2) If there is no hatch mark on the X axis, the embodiment uses a middle point of the X-axis label text boxes as a key point of the X axis, and filters the obtained candidate key points by a noise data filtering method.

(3) If there is no X-axis label text box, the number of legends is less than 3 and there are bars, the embodiment uses a middle position in the X direction of a bar as a key point position of the X-axis.

Figure 12:
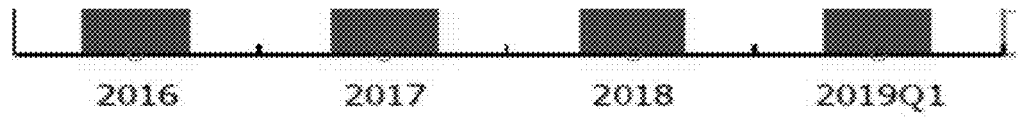
FIG. 12 shows locating key points on the X axis (indicated by small circles)

In an embodiment, there are X-axis hatch mark values in the input data graph. The X-axis key points are determined according to the positions of the hatch marks, as shown in FIG. 12, where circles indicate the positions of the X-axis key point.

6. Locating Key Points of the Bars and Polyline According to the X-Axis Key Points, Determining Labeled Numerical Text Boxes that Correspond to the Key Points, and Identifying the Numerical Text. The Specific Process Includes the Following Steps:

(1) determining key data points of the bars or polyline respectively, where the key data point of a vertical bar is the middle point of the top edge of the bar, and the key data point of a horizontal bar is the middle point of the far right of the bar, and the key data points of a polyline are the data points on the polyline corresponding to the key points of the X-axis;

(2) according to the position of a key data point, the layout of the data graph and the positions of the text boxes in the graph, searching for a corresponding labeled numerical text box for the key data point by means of distance and a threshold;

(3) identifying labeled numerical values in the labeled numerical text boxes by a digital recognition engine, because labeled values are generally numeric characters.

Figure 13:
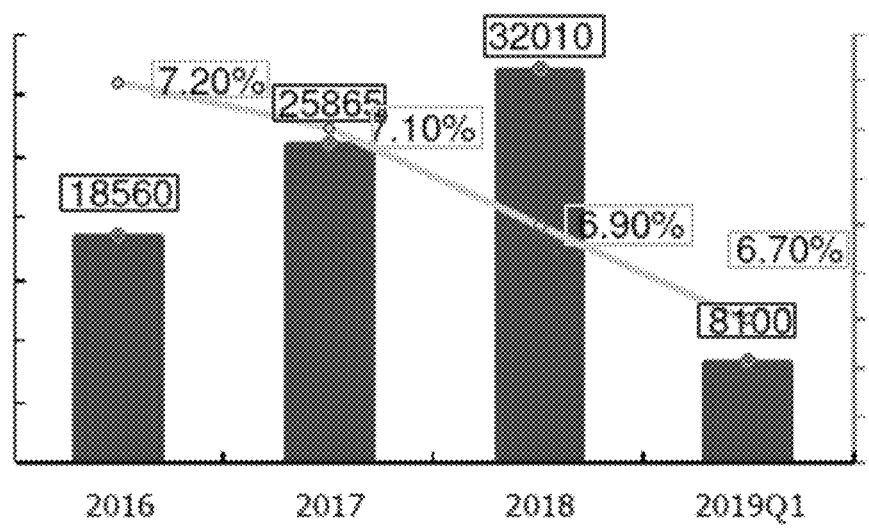
FIG. 13 shows the located bars, key points of the polyline and (indicated by small circles) and corresponding labeled text boxes (color of the rectangular frame corresponds to the legend color)

According to an embodiment, the located bars, key points of the polyline and (indicated by red small circles) and corresponding labeled text boxes (color of the rectangular frame corresponds to the legend color) are shown in FIG. 13. A recognition result of labeled numerical values of the bars (from left to right, with their actual values in parentheses) is: 18560 (18560), 25865 (25865), 32010 (32010), 18100 (8100). The last value is misidentified due to interference from the lines. A recognition result of labeled numerical text boxes corresponding to the key points of the polyline is: 720% (7.20%), 710% (7.10%), 86,90% (6.90%), 670%

(6.70%). It can be seen that the performance of existing recognition methods on decimal points is not good.

7. Calculating a Corresponding Value for Each Pixel, and Estimating Corresponding Values of the Key Points of the Bars or Polyline A corresponding value is estimated for each pixel according to the obtained Y-axis hatch mark value text boxes, the positions of the Y-axis hatch marks, the height of the bars and the corresponding text box values. When the corresponding value of each pixel has been obtained, estimated values of the key point are calculated according to the obtained coordinate axes and the positions of the key points. The specific process includes the following steps:

(1) A hatch value mark generally corresponds to a hatch mark value text box. When the Y-axis and its corresponding hatch mark value text box list have been determined, the embodiment matches according to the positional relationships between the positions of the Y-axis hatch marks and the Y-axis labeled numerical text boxes, and identifies the values in the labeled numerical text boxes by a value recognition engine.

(2) calculating a candidate every-pixel-corresponding-value list according to the difference between the number of pixels between two hatch marks and the difference between the values in the corresponding labeled numerical text boxes, where every-pixel-corresponding-value=hatch mark corresponding value difference/hatch mark position height difference; and the hatch mark corresponding value difference is the difference between the recognition results of the numerical text boxes corresponding to two hatch marks, and the hatch mark position height difference is the difference between the Y values of the positions of two hatch marks.

(3) filtering out noise from the every-pixel-corresponding-value list by a noise data filtering method (see the foregoing description)

(4) calculating the average value of the every-pixel-corresponding-value, as a final corresponding value of each pixel (5) according to the obtained corresponding value of each pixel and the height of the key data point (in vertical layout, it is the distance between the key point and the X-axis; in horizontal layout, it is the distance between the key point and the left Y-axis), calculating an estimated value for each key data point. The estimated value=(height of key point−height of X-axis)*every-pixel-corresponding-value.

In an embodiment, the bars corresponding to the left Y-axis have an every-pixel-corresponding-value: 103.09. The polyline corresponding to the right Y-axis has an every-pixel-corresponding-value: 0.00256641. The estimated values of the bars obtained according to the height of the bars (with actual values in parentheses) are: 18350.5 (18560), 25876.2 (25865), 31958.7 (32010), 8144.3 (8100). The estimated values corresponding to the key points based on the height of the key points of the polyline (with actual values in parentheses) are: 0.71867 (7.20%), 0.709444 (7.10%), 0.68970 (6.90%), 0.67072 (6.70%). It can be seen that the precision of the estimated values is lower than the recognition result of the numerical text boxes, but the accuracy is high, and there will not be a situation where the recognized value is significantly different from the actual value.

8. Determining a Final Result According to a Difference Between the Estimated Values and the Recognized Labeled Values, and Storing Error estimation is performed on the estimated value (est_val) obtained at a key point of the bars or polyline and the recognition result (reco_val) of a labeled numerical text box determined based on the key point, i.e., error=2*abs(est_val−reco_val)/(est_val+reco_val), and if the error is less than 0.1, it is determined that the recognition result is correct and the recognition result of the labeled numerical text box is used as the value of the key point; otherwise, the estimated value is used as the value of the key point. This step ensures the precision of the numerical identification while maintaining the accuracy of the numerical values, thereby eliminating the problem of significant errors brought by misidentification.

In an embodiment, the recognition result of the text box of a legend is stored as a subject of a row, and the X-axis label recognition result is stored as a subject of a column, to an Excel table. Table 1 below shows an example.

TABLE 1

| Recognition result of input graph | | | | |
|---|---|---|---|---|
| | 2016 | 2017 | 2018 | 2019.01 |
| Enforcement costs (million yuan) | 18560 | 25865 | 32010 | 8144.330 |
| Percentage in operating casts | 0.719 | 0.709 | 0.690 | 0.671 |

Figure 14:
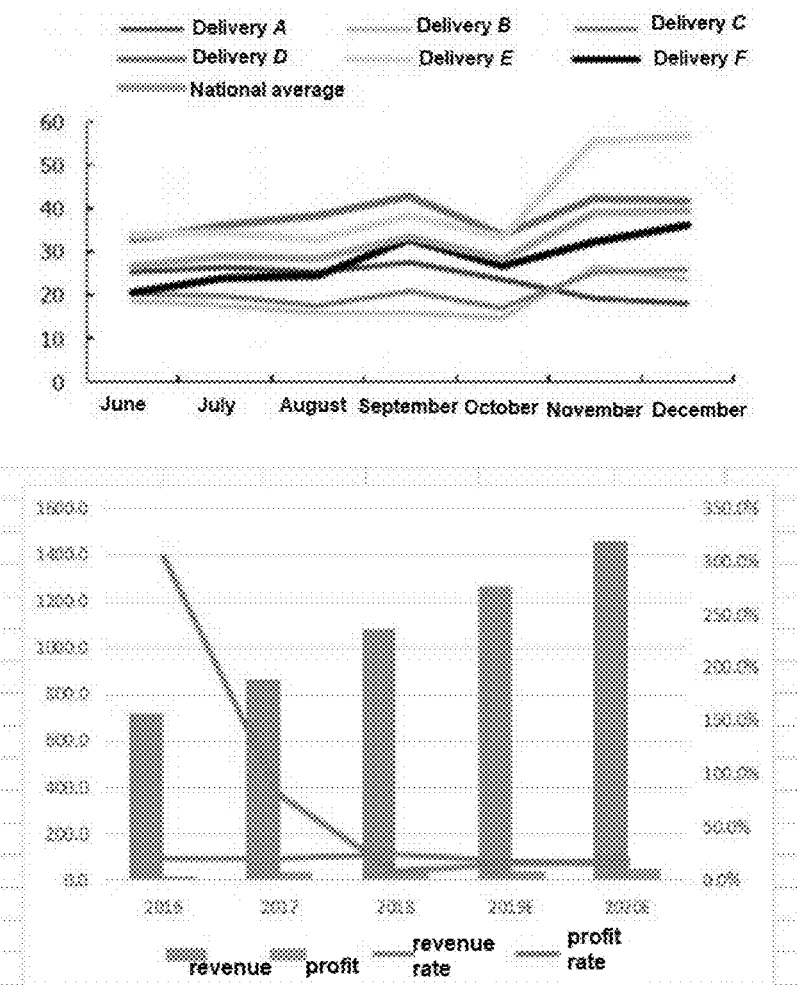
FIG. 14 shows exemplary input data graph and corresponding output result.

To test the validity of the method for different types of data graph input cases, the embodiment in FIG. 14 gives two other input data graph and their corresponding output results, which illustrates that the method of the present disclosure has high accuracy and precision, and is applicable to different types of data graphs, such as horizontally arranged bar charts, mixed data graphs of polyline and bars, and data graphs without coordinate axes.

The embodiments described above are only some preferred solution of the present disclosure, which shall not be construed as limiting the scope of the present disclosure. Those skilled in the art can make various changes and modifications without departing from the spirit and scope of the present disclosure, which shall all fall within the scope of the invention.

What is claimed is:

1. A method for extracting element data from a data graph with bars or polylines, comprising the steps of:
   (S1) text area locating and text box classification in the data graph according to steps S11 to S15:
      (S11) obtaining the data graph where data is to be extracted, locating all text boxes within the data graph by deep learning, and performing character recognition;
      (S12) counting the number of text boxes at each position in an X direction of the data graph, to obtain an array of numbers of text boxes at different positions in the X direction; obtaining a local maximum of the numbers of text boxes in the array and a corresponding position; obtaining the difference between an average number of text boxes in a middle area in the X direction and the local maximum of the array, and determining there is a Y-axis hatch mark value text box at the corresponding position of the local maximum if the difference is within an threshold; and determining all text boxes at the corresponding position of the local maximum as the Y-axis hatch mark value text boxes according to the corresponding position, to obtain a Y-axis hatch mark value text box list;

(S13) performing a text box spacing consistency test on the Y-axis hatch mark value text box list using a noise data filtering method, with the spacing between adjacent text boxes being a filtering condition;

(S14) obtaining an X-axis hatch mark value text box list;

(S15) identifying graph title text in a graph title text box according to size characteristics of the graph title text box and positional distribution characteristics in the data graph;

(S2) locating of coordinate axes, and locating of the positions of hatch marks on the coordinate axes according to steps S21 to S22:

(S21) locating coordinate axes from the data graph, which comprises:

first calculating a horizontal gradient and a vertical gradient of the data graph, respectively, and determining vertical edge pixels and horizontal edge pixels according to a horizontal gradient result and a vertical gradient result, respectively;

then counting the number of consecutive edge pixels in each column and the number of consecutive edge pixels in each row, determining an edge pixel column whose number of consecutive edge pixels exceeds a set threshold as a candidate Y-axis, and determining an edge pixel row whose number of consecutive edge pixels exceeds a set threshold as a candidate X-axis;

then merging adjacent candidate coordinate axes whose distance is less than a distance threshold;

finally determining the coordinate axis and axis hatch mark value text box lists according to a positional relationship between candidate coordinate axes and candidate axis hatch mark value text box lists;

(S22) locating the positions of hatch marks on X-axis and Y-axis sequentially, where each of the coordinate axes is located by:

first extracting a coordinate axis area image centered at a coordinate axis, where the width of the area image in a direction vertical to the coordinate axis covers the entire coordinate axis and hatch marks on the coordinate axis;

then binarizing the coordinate axis area image, where the coordinate axis and the hatch marks on the coordinate axis are foreground;

then counting foreground pixels in the binarized image in a direction vertical to the coordinate axis in a row-by-row or column-by-column manner;

then obtaining a local maximum of an array obtained from the counting, as the position of a candidate hatch mark;

finally filtering the obtained candidate hatch mark by the noise data filtering method, to obtain an actual hatch mark on the coordinate axis;

(S3) legend locating and information extraction according to steps S31 to S36:

(S31) performing connected component analysis by calculating color distances between adjacent pixels, to find all connected components with similar colors in the data graph; obtaining an average color value for each connected component, as the color of the connected component; and counting the number of pixels in the connected component and bounding rectangles;

(S32) filtering all the connected components according to height, width, number of pixels, aspect ratio and compactness of the connected components using a threshold method, to obtain a candidate legend meeting a legend requirement;

(S33) scanning all possible candidate legend connected components in pairs, so that two connected components meeting color and height consistency requirements are combined into a new candidate legend;

(S34) performing S31 to S33 on each of the three areas of the data graph: above, to the right of, and below a data area, to obtain all candidate legends in these three areas; selecting candidate legends in an area with the largest number of candidate legends as actual legends of the data graph according to the number of candidate legends in each of the three areas;

(S35) performing layout analysis on the obtained actual legends according to spatial positions of the actual legends, to determine whether the actual legends in the data graph are arranged in a vertical, horizontal or hybrid layout; and filtering out one or more of the actual legends nonconforming with the layout;

(S36) according to the layout of the actual legends, searching for a corresponding legend text box for each actual legend from the data graph, and identifying text characters and character color from each legend text box;

(S4) extracting corresponding bar or polyline connected components according to legend color, and filtering and classification according to steps S41 to S45:

(S41) combining background color, character color in the text and legend color into a color list of a variety of color classes; scanning the pixels in the data area of the data graph, calculating color distances between the color of a pixel and the variety of colors in the color list, and determining a color class having the smallest color distance as the class of the pixel;

(S42) performing connected component analysis on pixels of each class, filtering the connected components by a threshold method, to obtain a corresponding set of connected components for each actual legend in the data area;

(S43) based on the height, width, number of pixels and compactness of the connected components, scanning all connected component sets according to a threshold, to determine for each connected component whether the connected component is a bar, and if it is a bar, calculating the variance of the heights of all bars and the variance of the widths of all the bars in the data graph, determining whether the bars in the bar chart are horizontal or vertical according to the variances, and calculating the width of the bars; if there is no bar, determining that the data graph is a line chart, with a vertical layout;

(S44) according to the layout direction type of the data graph, identifying for each actual legend whether a connected component set corresponding to the actual legend is a bar or a polyline, and determining a classification axis and a numerical axis in the data graph;

(S45) for all the connected components corresponding to actual legends identified as bars, selecting a bar whose width meets the bar width described in S43 as a candidate bar for the actual legend, and analyzing the spatial positions and distances of all the bars to identify whether there is a bar divided by a polyline into two connected components, and if there is, recombining them into one;

(S5) determining key points on the classification axis and locating a corresponding classification-axis label for each classification-axis key point according to the layout direction type of the data graph;

(S6) locating key data points of the bars or polyline according to the classification-axis key points, determining a corresponding labeled numerical text box for each key data point, and identifying the numerical text;

(S7) calculating a corresponding value for each pixel according to the numerical axis, and estimating corresponding values for the key points of the bars or polyline; and (S8) for each key data point in the data graph, performing error verification on the identified numerical value by the estimated value, to determine a final result.

2. The method of claim 1, wherein the noise data filtering method comprises:
comparing all the data to be filtered in pairs, to find a data pair with the smallest value difference corresponding to the filter condition;
if the value difference meets an error requirement, calculating the average of the data pair and determining the average of the data pair as a standard value; and
then calculating a difference between each of the rest of the data to be filtered and the standard value, and filtering out data with a difference exceeding a threshold.

3. The method of claim 1, wherein in step S12, if there are Y-axis hatch mark value text boxes on both sides of the data graph, it is determined that there are two Y-axes, left and right; and
a left Y-axis hatch mark value text box list and a right Y-axis hatch mark value text box list are obtained.

4. The method of claim 1, wherein in step S33, the new candidate legend has a bounding rectangle composed of the bounding rectangles of the two connected components, the number of pixels is the sum of the pixels of the two connected components, and the color is the average of the colors of the two connected components.

5. The method of claim 1, wherein in step S44, the determining a classification axis and a numerical axis in the data graph comprises:
when the data graph is in a vertical layout, determining the X-axis as the classification axis and the Y-axis as the numerical axis; when the data graph is in a horizontal layout, determining the Y-axis as the classification axis and the X-axis as the numerical axis.

6. The method of claim 1, wherein step S5 comprises:
(S51) if there are hatch marks on the classification axis, sorting them based on their positions according to the obtained hatch marks on the classification axis; and determining a middle point of two adjacent hatch marks as a classification axis key point; and
(S52) if there is no hatch mark on the classification axis, determining a middle point between classification axis hatch mark value text boxes as a classification axis key point; and filtering the obtained classification axis key points by the noise data filtering method.

7. The method of claim 1, wherein step S6 comprises:
(S61) determining key data points of the bars or polyline respectively, where the key data point of a vertical bar is a middle point of the top edge of the bar, and the key data point of a horizontal bar is a middle point of the far right of the bar, and the key data points of a polyline are the data points on the polyline vertically corresponding to the key points of the classification axis;

(S62) according to the position of each key data point, the layout of the data graph and the positions of the text boxes in the data graph, searching for a corresponding labeled numerical text box for each key data point; and (S63) identifying a labeled numerical value in each labeled numerical text box.

8. The method of claim 1, wherein step S7 comprises:
(S71) matching according to the positional relationships between the hatch marks on the numerical axis and the labeled numerical text boxes on the numerical axis, and identifying the values in the labeled numerical text boxes on the numerical axis;

(S72) for any two adjacent hatch marks on the numerical axis, calculating a corresponding value for each pixel according to the difference between the number of pixels between two hatch marks and the difference between the values in the corresponding labeled numerical text boxes, where the calculated values form a single pixel corresponding value list;

(S73) filtering out noise from the single pixel corresponding value list by the noise data filtering method;

(S74) calculating an average value of the single pixel corresponding value list after the noise filtering, as a final corresponding value M of the single pixel; and (S75) according to the obtained corresponding value M of the single pixel and the bar height H of the key data points, calculating an estimated value for each key data point, where the bar height H of a data graph in a vertical layout is the distance from the key data point to the X-axis, and the bar height H of a data graph in a horizontal layout is the distance from the key data point to the left Y axis.

9. The method of claim 8,
wherein step S6 comprises:
(S61) determining key data points of the bars or polyline respectively, where the key data point of a vertical bar is a middle point of the top edge of the bar, and the key data point of a horizontal bar is a middle point of the far right of the bar, and the key data points of a polyline are the data points on the polyline vertically corresponding to the key points of the classification axis;
(S62) according to the position of each key data point, the layout of the data graph and the positions of the text boxes in the data graph, searching for a corresponding labeled numerical text box for each key data point; and
(S63) identifying a labeled numerical value in each labeled numerical text box; and
wherein step S8 comprises:
for each key data point in the data graph, comparing the labeled value obtained by step S63 with the estimated value obtained by step S75, and if within an error range, determining the recognition result correct and determining the labeled value as the value of the key point; otherwise, determining the estimated value as the value of the key point.

* * * * *